United States Patent
Washington

(10) Patent No.: US 10,013,962 B2
(45) Date of Patent: Jul. 3, 2018

(54) ILLUMINATED INSTRUMENT STRAP

(71) Applicant: Derek Washington, Auburn Hills, MI (US)

(72) Inventor: Derek Washington, Auburn Hills, MI (US)

( * ) Notice: Subject to any disclaimer, the term of this patent is extended or adjusted under 35 U.S.C. 154(b) by 0 days.

(21) Appl. No.: 15/460,706

(22) Filed: Mar. 16, 2017

(65) Prior Publication Data
US 2017/0270902 A1 Sep. 21, 2017

Related U.S. Application Data

(60) Provisional application No. 62/308,913, filed on Mar. 16, 2016.

(51) Int. Cl.
*G10G 5/00* (2006.01)
*H05B 33/08* (2006.01)

(52) U.S. Cl.
CPC ......... *G10G 5/005* (2013.01); *H05B 33/0845* (2013.01); *H05B 33/0854* (2013.01)

(58) Field of Classification Search
CPC .................................................... G10G 5/005
See application file for complete search history.

(56) References Cited

U.S. PATENT DOCUMENTS

| | | | | |
|---|---|---|---|---|
| 3,037,416 A * | 6/1962 | Cunningham | ......... | G10G 5/005 224/269 |
| 3,323,698 A | 6/1967 | Robert | | |
| 3,324,755 A * | 6/1967 | Canonico | ............... | G10D 1/085 84/267 |
| 3,366,293 A * | 1/1968 | Fyke | ...................... | G10G 5/005 224/255 |
| 4,236,191 A * | 11/1980 | Martinez | .............. | G02B 6/0005 362/554 |
| 4,271,458 A * | 6/1981 | George, Jr. | ............. | F21V 15/04 362/236 |
| 4,523,258 A * | 6/1985 | Morse | ................. | F21V 33/0008 362/108 |
| 4,563,933 A * | 1/1986 | Kim | ........................ | A63J 17/00 84/267 |
| 4,745,837 A | 5/1988 | Rimsa | | |

(Continued)

OTHER PUBLICATIONS

Meadows, Illuminated Ukulele Strap, Mar. 17, 2017, YouTube, https://www.youtube.com/watch?v=rw4RHPcBWxE.*

(Continued)

*Primary Examiner* — Robert W Horn
(74) *Attorney, Agent, or Firm* — Gautam B. Singh; Singh Law Firm, PLLC

(57) ABSTRACT

An illuminated instrument strap. The illuminated instrument strap includes an instrument strap having a fastener to removably secure the illuminated instrument strap to an instrument. A light operably connected to a control box is disposed along the length of the instrument strap. The control box includes a logic that is at least partially stored in a non-transitory computer readable medium and that, when executed at least in part by a controller, causes the light to illuminate in a pre-programmed pattern. In another embodiment, the control box includes a microphone, that transmits audio input information to a controller, causing the controller to synchronize an illumination of the light to the audio input information in a music visualization pattern.

20 Claims, 3 Drawing Sheets

(56) References Cited

U.S. PATENT DOCUMENTS

| | | | | |
|---|---|---|---|---|
| 4,887,552 A * | 12/1989 | Hayden | A01K 27/006 119/793 |
| 5,291,816 A * | 3/1994 | Adams | G10G 5/005 224/257 |
| 5,478,969 A * | 12/1995 | Cardey, III | G10H 1/02 84/626 |
| 5,796,025 A * | 8/1998 | Haake | G10H 3/18 84/464 A |
| 5,850,807 A * | 12/1998 | Keeler | A01K 27/009 119/799 |
| 5,868,293 A | 2/1999 | D'Addario et al. | |
| 5,967,095 A * | 10/1999 | Greves | A01K 27/006 119/792 |
| 6,031,166 A * | 2/2000 | Petrarca | G10G 5/005 84/267 |
| 6,283,612 B1 * | 9/2001 | Hunter | F21V 15/015 362/217.05 |
| 6,371,637 B1 * | 4/2002 | Atchinson | F21V 19/005 362/249.04 |
| 6,557,498 B1 * | 5/2003 | Smierciak | A01K 27/006 119/858 |
| 6,840,655 B2 * | 1/2005 | Shen | F21S 4/26 362/227 |
| 6,846,094 B2 * | 1/2005 | Luk | H05B 33/0857 362/240 |
| 6,970,090 B1 * | 11/2005 | Sciarra | A01K 15/023 119/795 |
| 7,147,347 B1 * | 12/2006 | Khachakian | F21V 33/0056 362/227 |
| 7,210,818 B2 * | 5/2007 | Luk | H05B 33/0857 361/749 |
| 7,491,876 B2 | 2/2009 | Peacock | |
| 7,536,980 B2 * | 5/2009 | Cooper | A01K 27/006 119/792 |
| 7,594,482 B1 * | 9/2009 | Toplin | A01K 27/006 119/792 |
| 7,690,331 B2 * | 4/2010 | Hurwitz | A01K 27/006 119/795 |
| D673,998 S * | 1/2013 | Wells | D17/20 |
| 8,710,341 B2 | 4/2014 | Bowen | |
| 8,789,988 B2 * | 7/2014 | Goldwater | F21S 4/22 362/217.01 |
| 8,840,263 B1 * | 9/2014 | Jones | G08B 5/004 362/108 |
| 9,545,084 B2 * | 1/2017 | Osher | A01K 27/006 |
| 2002/0154787 A1 * | 10/2002 | Rice | H04R 29/008 381/124 |
| 2005/0018417 A1 * | 1/2005 | Chien | A43B 1/0036 362/103 |
| 2007/0263385 A1 * | 11/2007 | Fan | G09F 13/22 362/249.16 |
| 2011/0102304 A1 * | 5/2011 | Nelson | G09G 3/00 345/46 |
| 2012/0243246 A1 * | 9/2012 | Waring | B60Q 1/2657 362/473 |
| 2012/0299480 A1 * | 11/2012 | Peting | H05B 37/0263 315/113 |
| 2013/0009553 A1 * | 1/2013 | Lee | H05B 33/0824 315/153 |
| 2013/0019372 A1 * | 1/2013 | Esses | A41D 27/085 2/69 |
| 2013/0235570 A1 * | 9/2013 | Hood | F21V 21/00 362/225 |
| 2014/0098523 A1 * | 4/2014 | Sutton | A41D 13/00 362/103 |
| 2014/0109615 A1 * | 4/2014 | Millan | B26B 9/00 63/1.12 |
| 2014/0132154 A1 * | 5/2014 | Fried | A41D 27/085 315/76 |
| 2015/0345717 A1 * | 12/2015 | Gerpheide | F21L 4/02 362/158 |
| 2016/0223149 A1 * | 8/2016 | Gerpheide | F21L 4/00 |
| 2017/0270902 A1 * | 9/2017 | Washington | G10G 5/005 |

OTHER PUBLICATIONS

Lam, Triple LED Guitar Strap—Unboxing & Review, Apr. 1, 2014 YouTube, https://www.youtube.com/watch?v=WU46VfW_xko.*

* cited by examiner

ILLUMINATED INSTRUMENT STRAP

CROSS REFERENCE TO RELATED APPLICATIONS

This application claims the benefit of U.S. Provisional Application No. 62/308,913 filed on Mar. 16, 2016. The above identified patent application is herein incorporated by reference in its entirety to provide continuity of disclosure.

BACKGROUND OF THE INVENTION

The present invention relates to instrument straps. More specifically, the present invention provides an illuminated instrument strap.

Instrument straps are frequently used to assist in supporting the instrument while the musician plays it. Many musicians enjoy employing theatricality via customizing their equipment and instruments to provide a unique appearance. Generally, instrument straps are not modified or customized by musicians as they are not easily visible to the audience. Therefore, an instrument strap that provides a more visible and unique appearance than conventional straps via a series of lights is provided.

In light of the devices disclosed in the known art, it is submitted that the present invention substantially diverges in design elements from the known art and consequently it is clear that there is a need in the art for an improvement to existing instrument straps. In this regard, the instant invention substantially fulfills these needs.

SUMMARY OF THE INVENTION

In view of the foregoing disadvantages inherent in the known types of instrument straps now present in the prior art, the present invention provides an illuminated instrument strap wherein the same can be utilized for providing convenience for the user when customizing the user's equipment to create a visible and unique appearance.

The present system comprises an instrument strap. A fastener adapted to removably secure the instrument strap to an instrument is disposed on the instrument strap. A plurality of lights is disposed along the length of the instrument strap. A control box having a power source and a power button is operably connected to the plurality of lights. In some embodiments, the control box further comprises a controller adapted to illuminate the plurality of lights in a pre-programmed pattern stored at least partially in the non-transitory memory of the controller. In another embodiment, the control box further comprises a microphone adapted to transmit an audio input to the controller to synchronize the illumination of the plurality of lights to the audio input in a music visualization pattern. In yet another embodiment, the control box further comprises a switch adapted to toggle between the pre-programmed pattern and the sound input from the microphone. In some embodiments, the control box comprises a potentiometer adapted to vary the frequency of the pre-programmed pattern. In another embodiment, the control box is removably securable to the instrument strap. In yet another embodiment, the plurality of lights comprises LEDs. In some embodiments, the instrument strap further comprises an adjustment mechanism configured to change the length of the instrument strap. In another embodiment, the plurality of lights is arranged in one or more rows along the length of the instrument strap. In yet another embodiment, the fastener comprises an aperture.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
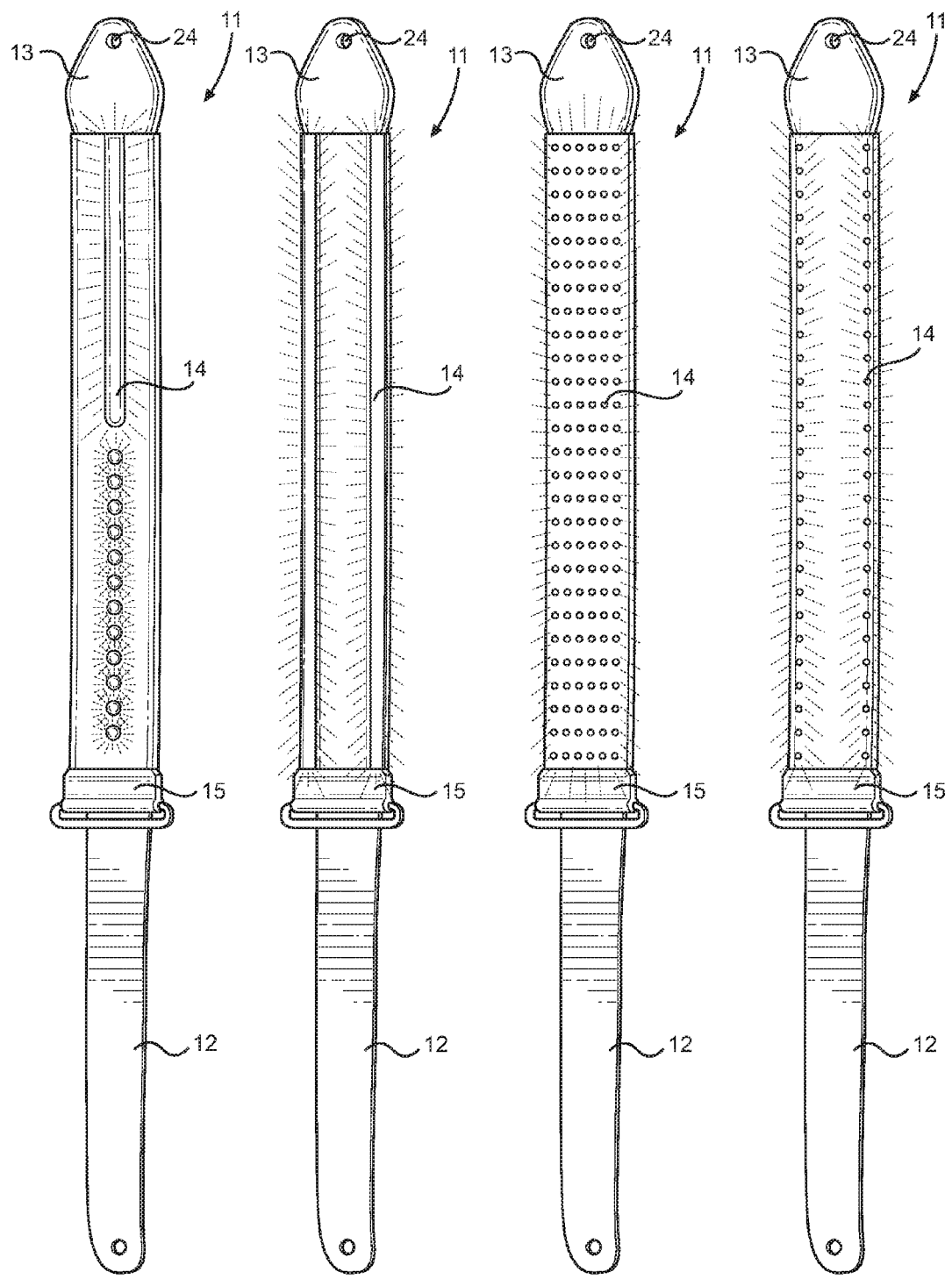
FIG. 1A shows a front view of an embodiment of the illuminated instrument strap.
FIG. 1B shows a front view of an alternate embodiment of the illuminated instrument strap.
FIG. 1C shows a front view of an alternate embodiment of the illuminated instrument strap.
FIG. 1D shows a front view of an alternate embodiment of the illuminated instrument strap.

Reference is made herein to the attached drawings. Like reference numerals are used throughout the drawings to depict like or similar elements of the instrument strap. The figures are intended for representative purposes only and should not be considered to be limiting in any respect.

Referring now to FIGS. 1A, 1B, 1C, and 1D, there is shown a front view of several embodiments of the illuminated instrument strap. The illuminated instrument strap comprises an instrument strap 11 having a first end 12 and a second end 13. In some embodiments, the instrument strap 11 comprises a fabric material. In the illustrated embodiment, the first and seconds ends 12, 13 further comprise fasteners 24 adapted to removably secure to an instrument including, but not limited to, a guitar and a bass guitar. In the illustrated embodiments, the fasteners 24 comprise an aperture thereon to engage with the attachment protrusions of a guitar. In other embodiments, the fasteners 24 include other fastening means, such as D-rings, hooks, and carabiners. In some embodiments, the instrument strap 11 comprises an adjustment mechanism 15, such as a buckle or loop, that allows the instrument strap 11 to be varied to a desired length.

In the illustrated embodiment, a plurality of lights 14 is disposed along the length of the instrument strap 11. In the illustrated embodiments, the plurality of lights comprises LEDs, however other lighting options are acceptable. The plurality of lights 14 may be arranged in one or more rows along the length of the instrument strap 11. For example, in the illustrated embodiments, the plurality of lights 14 may comprise a single row down the center of the instrument strap 11, two rows down the edges of the instrument strap 11, several rows down the entirety of the center of the instrument strap 11, and other similar arrangements. In some embodiments, the plurality of lights 14 comprise a light strip. The plurality of lights 14 may also comprise a variety of colored LEDs.

Figure 2:
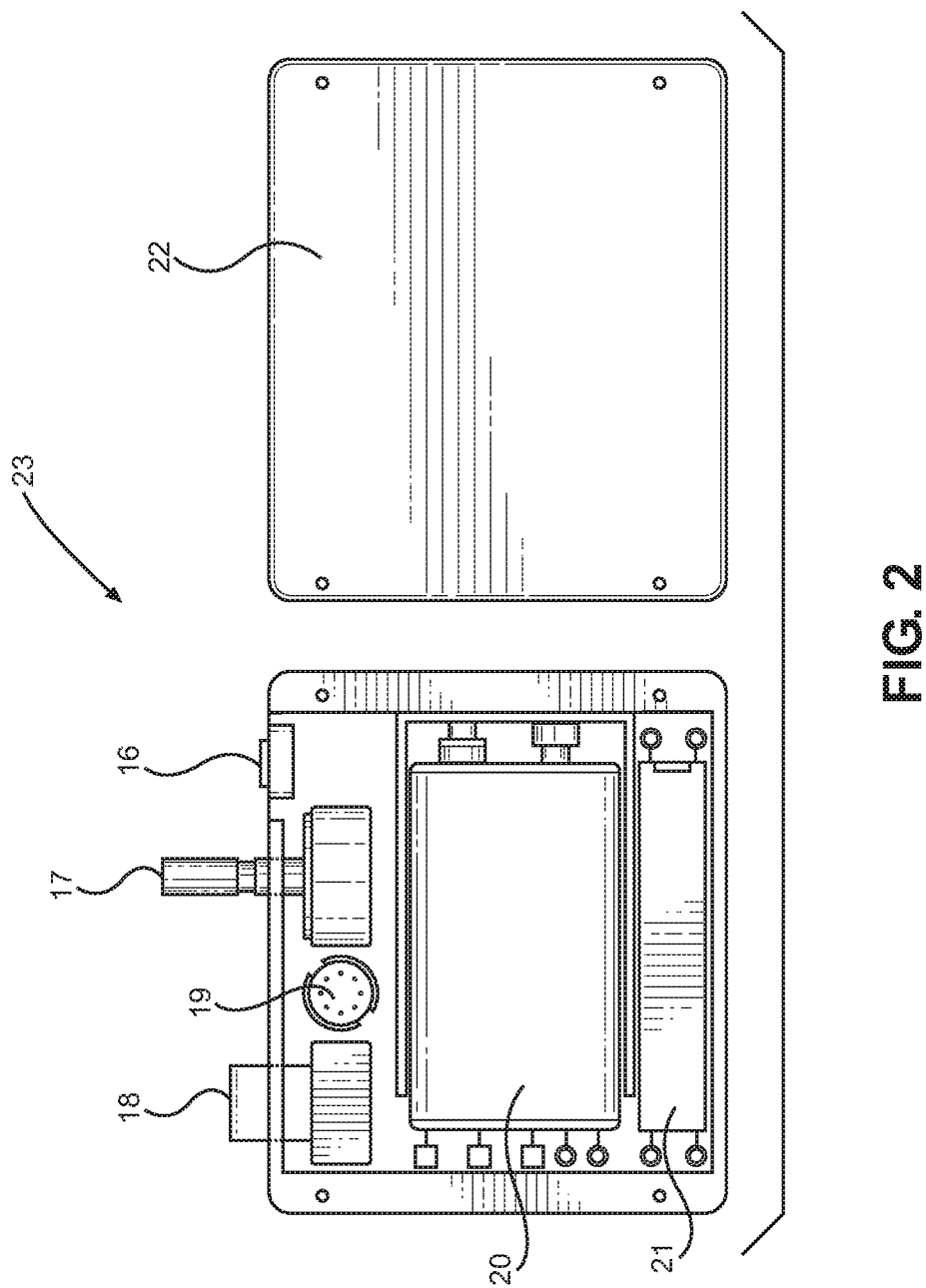
FIG. 2 shows a top down view of an embodiment of the control box of the illuminated instrument strap.

Referring now to FIG. 2, there is shown a top down view of an embodiment of the control box of the illuminated instrument strap. The illuminated instrument strap further comprises a control box 23 is electrically connected to the plurality of lights 14. In the illustrated embodiment, the control box 23 comprises a power source 20, a power button 16, and a lid 22. The power source 20 provides power to the plurality of lights 14, illuminating them, when the power button 16 is actuated. The lid 22 removably secures to the top of the control box 23 protecting the internal components from damage during use.

In the illustrated embodiment, the control box 23 further comprises a controller 21. The controller 21 at least in part executes a logic that illuminates the plurality of lights 14 in one of several pre-programmed patterns at least partially stored in the non-transitory memory of the controller 21. The pre-programmed patterns may include steady flashing, randomized flashing, sequential illumination, and the like. In the illustrated embodiment, the control box 23 further comprises a sensor 17. In some embodiments, the sensor 17 comprises a potentiometer. The sensor 17 controls the speed of the pre-programmed patterns. For example, if the selected pre-programmed pattern was steady flashing, when turned in one direction, the sensor 17 would slow the frequency of flashing, and in the opposite direction, the frequency of flashing would increase, up to constant illumination.

In the illustrated embodiment, the control box 23 further comprises a music visualization system. A microphone 19 transmits a received audio input signal to the controller 21. The controller 21 activates the plurality of lights 14 such that the plurality of lights 14 are illuminated in synchronization with the audio input signals received by the microphone 19. In this way, the plurality of lights 14 are illuminated in time with the music being played on the instrument. In the illustrated embodiment, the control box 23 includes a switch 18. The switch 18 is adapted to toggle between the pre-programmed patterns of the controller 21 and the music visualization pattern created by the audio input signals from the microphone 19.

Figure 3:
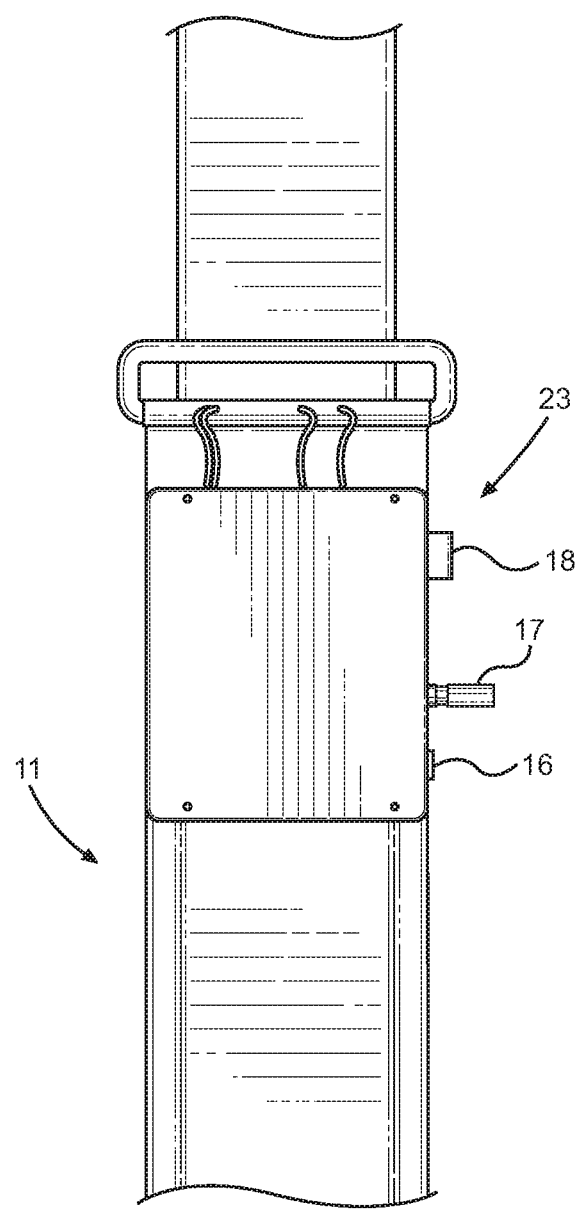
FIG. 3 shows a rear view of an embodiment of the illuminated instrument strap.

Referring now to FIG. 3, there is shown a rear view of an embodiment of the illuminated instrument strap. In the illustrated embodiment, the control box 23 is removably secured at the rear of the instrument strap 11, at one of the first and second ends 12, 13. This positioning allows the user to interact with the control box 23 while wearing the illuminated instrument strap. The control box 23 is operably connected to the plurality of lights 14 disposed on the front of the instrument strap. In some embodiments, the control box 23 is connected to the plurality of lights wirelessly. In some embodiments, the control box 23 is removably secured to the instrument strap 11, while in other embodiments, the control box 23 is contained within a pocket disposed on the rear of the instrument strap 11.

In one use, the user would removably secure the instrument strap 11 to the instrument to be played at the first and second ends 12, 13. The user would determine which of the pre-programmed patterns they would like the plurality of lights 14 to display. In the illustrated embodiment, the user would then adjust the sensor 17 to increase or decrease the frequency the plurality of lights 14 would display the chosen pattern. The user may also decide to instead synchronize the flashing of the plurality of lights 14 with the music being played. The user would then toggle the switch 18 to activate the microphone 19. The microphone 19 would then transmit the incoming audio input signals to the controller 21, which in turn activates the plurality of lights 14 in time with audio input signals, in a music visualization pattern. The user would then put on the instrument by draping the instrument strap 11 over their shoulder. At any time during the performance, the user may decide to alter the frequency of the pattern by adjusting the sensor 17, or toggle the switch 18 to change the activation of the plurality of lights 14 to the alternate option. The position of the control box 23 at either the first or second end 12, 13 on the instrument strap 11 allows the user to interact with the control box 23 while playing the instrument.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An instrument strap
   a first end and a second end wherein each of the first end and the second end has a fastener disposed thereupon with each of the fastener adapted to removably secure the instrument strap to an instrument;
   an adjustment mechanism where the adjustment mechanism is disposed between the first end and the second end and separates the instrument strap into a first segment and a second segment wherein the adjustment mechanism is further adapted to change the length of the instrument strap by shortening or elongating a length of the second segment;
   a light disposed on first segment of the instrument strap, the light having a connection to a control box wherein the connection between the control box and light is adapted to supply a power to the light;
   a power source capable of supplying the power to the light;
   the control box attached to the first segment comprising a controller having a non-transitory memory which at least partially stores a logic;
   where the non-transitory memory is a readable medium and that, when the logic is read by and executed at least in part by the controller, causes the control box to enable the power source to supply power to the light to illuminate in a manner determined by the logic.

2. The instrument strap of claim 1, wherein the control box is removably securable to the instrument strap.

3. The instrument strap of claim 1, wherein the light comprises LEDs.

4. The instrument strap of claim 1, further comprising an adjustment mechanism adapted to slide and overlap the second segment slides over the first segment to effectively shorten the length of the intrument strap.

5. The instrument strap of claim 1, wherein the light comprises a plurality of lights arranged in one or more rows along the length of the instrument strap.

6. The instrument strap of claim 1, wherein the fastener comprises an aperture adapted to secure the instrument strap on a mounting post of an instrument.

7. The instrument strap of claim 1, wherein the control box further includes a power source.

8. The instrument strap of claim 1, wherein
the control box further includes a microphone, the microphone adapted to transmit audio input information to the controller;
the controller programmed to use the audio input information to create the logic with the logic causing the illumination pattern of the light to be synchronized to the audio input information whereby the light represents a music visualization pattern.

9. The instrument strap of claim 8, wherein the control box further comprises a switch adapted to select the logic for the illumination pattern of the light from the logic generated by the audio input information or from a previously stored logic stored in the non-transitory memory.

10. The instrument strap of claim 1, wherein the control box comprises a potentiometer, the potentiometer adapted to provide an input to the controller adapted to cause the logic to change the frequency, cause randomized flashing, sequential illumination or other programmed changes of the light illumination.

11. An instrument strap, comprising:
a first end and a second end wherein each of the first end and the second end has a fastener disposed thereupon with each of the fastener adapted to removably secure the instrument strap to an instrument;
an adjustment mechanism where the adjustment mechanism is disposed between the first end and the second end and separates the instrument strap into a first segment and a second segment wherein the adjustment mechanism is further adapted to change the length of the instrument strap by shortening or elongating a length of the second segment;
a light disposed on first segment of the instrument strap, the light operably connected having a connection to a control box wherein the connection between the control box and light is adapted to supply a power to the light;
a power source capable of supplying the power to the light;
the control box attached to the first segment comprising a microphone capable of receiving a sound signal, the microphone adapted to transmit audio input information to a controller, and the controller having a non-transitory memory which at least partially stores a logic where the logic creates a synchrony signal to be transmitted to the control box, where
the synchrony signal causes the control box to have the power source supply power to the light in a manner determined by the input transmitted to the controller by the microphone thereby causing a visualization of the sound signal.

12. The instrument strap of claim 11, wherein the control box is removably securable to the instrument strap.

13. The instrument strap of claim 11, wherein the light comprises LEDs.

14. The instrument strap of claim 11, further comprising an adjustment mechanism wherein the second segment is adapted to be shortened by sliding and doubling at least a portion of the second segment over itself thereby effectively shortening the length of the instrument strap.

15. The instrument strap of claim 11, wherein the light comprises a plurality of lights arranged in one or more rows along the length of the instrument strap.

16. The instrument strap of claim 11, wherein the control box further includes a power source.

17. The instrument strap of claim 11, wherein the fastener comprises an aperture adapted to secure the instrument strap on a mounting post of an instrument.

18. An instrument strap, comprising:
a first end and a second end wherein each of the first end and the second end has a fastener disposed thereupon with each of the fastener adapted to removably secure the instrument strap to an instrument;
an adjustment mechanism where the adjustment mechanism is disposed between the first end and the second end and separates the instrument strap into a first segment and a second segment wherein the adjustment mechanism is further adapted to change the length of the instrument strap by shortening or elongating a length of the second segment;
a light disposed on first segment of the instrument strap, the light having a connection to a control box wherein the connection between the control box and light is adapted to supply a power to the light;
a power source capable of supplying the power to the light;
the control box attached to the first segment comprising a controller having a non-transitory memory which at least partially stores a logic that generated a lighting pulse, a microphone capable of receiving a sound signals and transmitting synchrony pulse to the controller, where
the controller combines the lighting signal from stored logic and the synchrony signal from the microphone to generate a signal for the control box;
having the control box supply power to the light to illuminate in a manner determined by the signals from the controller.

19. The instrument strap of claim 18, further comprising:
a switch having as its input as the lighting pulse and the synchrony pulse,
the switch is adapted to select either the lighting pulse or the synchrony pulse for feeding to the controller.

20. The instrument strap of claim 18, further comprising:
a potentiometer having its input as the lighting pulse wherein the lighting pulse has a frequency,
the potentiometer adapted to modulate the frequency, cause randomized flashing, sequential illumination or other programmed changes of the of the lighting pulse.

* * * * *